Jan. 29, 1924.
J. J. SERRELL
1,482,095
FLEXIBLE COUPLING
Filed April 20, 1921
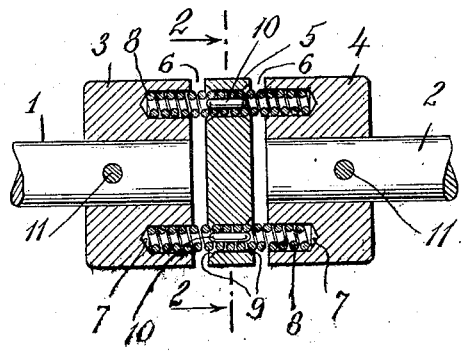
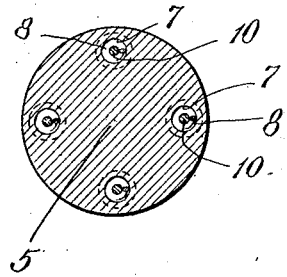
Inventor
John J. Serrell
By his Attorney
Harry L. Duncan Patented Jan. 29, 1924.

1,482,095

UNITED STATES PATENT OFFICE.

JOHN J. SERRELL, OF ELIZABETH, NEW JERSEY, ASSIGNOR TO SMITH AND SERRELL, OF MAHWAH, NEW JERSEY, A COPARTNERSHIP CONSISTING OF HIMSELF AND ROBERT A. SMITH.

FLEXIBLE COUPLING.

Application filed April 20, 1921. Serial No. 462,939.

*To all whom it may concern:*

Be it known that I, JOHN J. SERRELL, of Elizabeth, Union County, State of New Jersey, a citizen of the United States, have made a certain new and useful Invention Relating to Flexible Couplings, of which the following is a specification, taken in connection with the accompanying drawing, which forms part of the same.

This invention relates especially to flexible couplings adapted for small powers such as the connections between light electric motors and machinery driven thereby. The coupling may comprise two coupling members adapted to be connected to the shaft sections or other rotating parts to be connected. Each of these coupling members is formed with a series of pin sockets which are preferably annularly arranged so that the sockets are parallel to the axes of the coupling members. Spiral spring coupling pins which preferably fit loosely in cooperating sockets in the coupling members are used to connect them and these coupling pins are preferably loosely or slidingly arranged in the sockets, so as to readily allow such annular or longitudinal movement as may be necessary under operating conditions. In many cases it is desirable to have the coupling pins connected to a pin support of disc or annular form, which may be conveniently provided with holes for the coupling pins in which they may fit sufficiently tightly to be permanently retained therein in connection if desired with a suitable central securing member. In this way a simple and desirable coupling member is provided which can be cheaply produced in large quantities.

In the accompanying drawing showing in a somewhat diagrammatic way an illustrative embodiment of this invention.

Fig. 1 is a longitudinal section; and

Fig. 2 is a transverse section taken substantially along the line 2—2 of Fig. 1.

The coupling members 3, 4 which are preferably rigid may be formed of any suitable metal or material and connected to the shafts 1, 2 as by connector pins 11. Each of these coupling members may be formed with an annular series of pin sockets 7, which are preferably though not necessarily substantially parallel with the axis of the corresponding coupling member. As shown in Figs. 1 and 2, four such pin sockets are formed in each of the coupling members and extend substantially half way through the same.

The spiral spring or resilient coupling pins 8 may be loosely arranged in these pin sockets and are preferably secured to an intermediate pin support 5, which can be formed with holes preferably having flaring recesses 9 at the end thereof, so as to provide if desired a somewhat increased amount of resilient flexibility in the coupling pins. This is also regulated by the amount of longitudinal spacing 6 between the pin support and coupling members, so that ample radial movement can thus be secured to take care of the usual amount of misalignment of the shaft sections. It is sometimes desirable to tightly secure the coupling pins in the pin support and for this purpose the holes may be small enough so that the pins fit tightly or instead of this arrangement or in addition thereto, a central securing member such as 10 may be tightly forced inside each coupling pin so as to tightly secure its intermediate portion to the pin support. The pin support and resilient pins thus form a single element of the coupling which reduces the number of parts and facilitates assembly.

This invention has been described in connection with a number of illustrative embodiments, forms, shapes, proportions, sizes, materials, and arrangements, to the details of which disclosure the invention is not of course to be limited, since what is claimed as new and what is desired to be secured by Letters Patent is set forth in the appended claims.

1. In flexible couplings, rigid coupling members adapted to be connected to rotary members and each formed with an annular series of sockets substantially parallel to its axis, a series of resilient spiral spring coupling pins each extending a considerable distance into a socket of each of the two cooperating coupling members and fitting loosely therein, and a rigid pin support arranged between and normally spaced somewhat away from said coupling members and formed with conically relieved end holes in which the intermediate portions of said couping pins are permanently and substantially rigidly connected by expanding securing members inside the corresponding intermediate portions of said pins.

2. In flexible couplings, rigid coupling members adapted to be connected to rotary members and each formed with a corresponding series of sockets substantially parallel to and remote from its axis, a series of resilient spiral spring coupling pins each extending a considerable distance into a socket of each of the two cooperating coupling members and fitting loosely therein, and a rigid pin support arranged between and normally spaced somewhat away from said coupling members and formed with holes in which the intermediate portions of said coupling pins are substantially rigidly connected by members inside the corresponding intermediate portions of said pins.

JOHN J. SERRELL.